United States Patent [19]

Macheboeuf

[11] 4,292,649
[45] Sep. 29, 1981

[54] COMPOSITE VIDEO SIGNAL COMBINING SYSTEM

[75] Inventor: Guy R. Macheboeuf, Vitry-sur-Seine, France

[73] Assignee: Telediffusion de France, Paris, France

[21] Appl. No.: 121,779

[22] Filed: Feb. 14, 1980

[30] Foreign Application Priority Data

Feb. 12, 1979 [FR] France .................. 79 03521

[51] Int. Cl.³ ........................................... H04N 9/535
[52] U.S. Cl. ............................................... 358/22
[58] Field of Search ........................... 358/22, 183

[56] References Cited

U.S. PATENT DOCUMENTS

3,764,732 10/1973 Macheboeuf .................. 358/22

*Primary Examiner*—John C. Martin
*Attorney, Agent, or Firm*—Abraham A. Saffitz

[57] ABSTRACT

The system combines first and second composite video signals into a resulting composite video signal. The first composite video signal represents a foreground scene having a first trichromatic moving picture region which envelopes a second trichromatic backing region through a trichromatic transition region. The second composite video signal represents a background scene. A gain controlling circuit produces from first component video signals first and second analog signals $(1-\alpha)$, $(\alpha)$ which control in proportion the amplifications of the first and second composite video signals to obtain second output composite video signals. The first analog signal has first and second levels when the first component video signals are representative of the first and second picture regions and has intermediate levels lying between the first and second levels when the first component video signals are representative of the transition region. A video mixer mixes the first and second output composite video signals into the resulting composite video signal.

13 Claims, 8 Drawing Figures

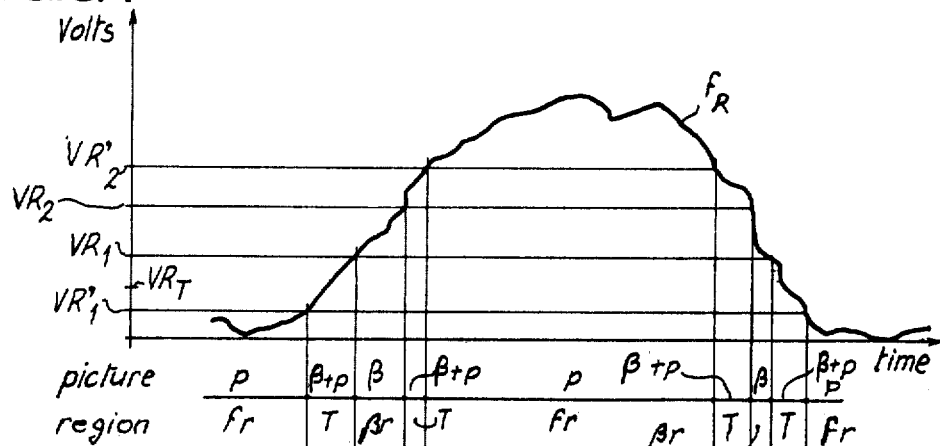
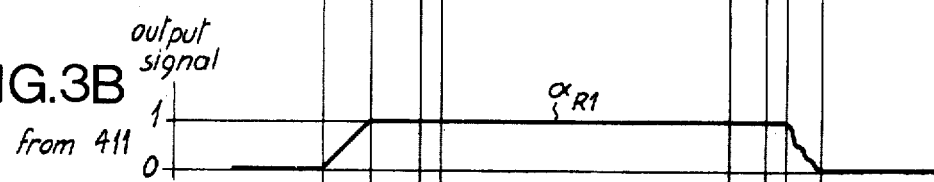
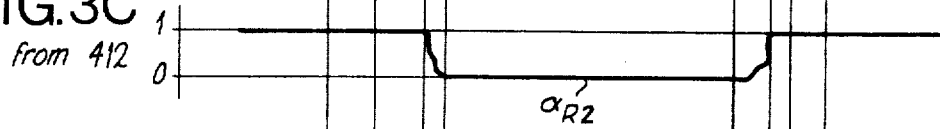
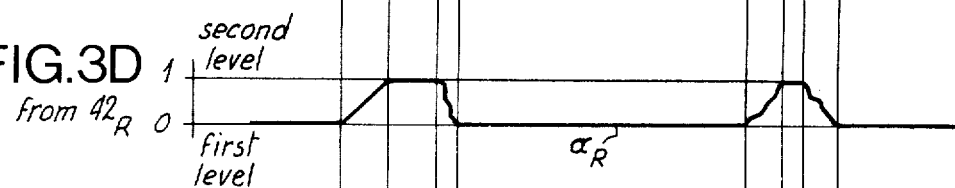
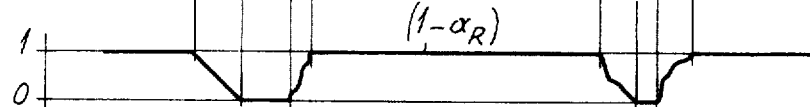

COMPOSITE VIDEO SIGNAL COMBINING SYSTEM

BACKGROUND OF THE INVENTION

1. Field of the Invention

The present invention relates to a composite video signal combining system by which separately produced composite video signals representing a trichromatic foreground scene, such as a person picture in front of a backing, and a trichromatic background scene may be combined electronically to produce an output composite video signal representative of a resulting combined picture.

2. Description of the Prior Art

This invention pertains more particularly to a composite color picture combining method for which the foreground picture, as a person, is initially filmed before a trichromatic backing. Relatively to a primary colorimetric coordinate system, the trichromatic region of the backing is enveloped by the trichromatic region representative of the foreground. A second video source, such as a camera, films the background scene such as a landscape.

This method is disclosed in the U.S. Pat. No. 3,764,732. The composite video signal combining system according to this U.S. Patent produces primary control signals from separated component video signals forming the composite video signal representative of the foreground scene. For each component video signal the primary control signal is a logic signal having two levels. A first level or low level corresponds to picture points of the foreground picture (or person). The first level is produced when the amplitude of the corresponding foreground component video signal does not lie within a reference voltage range, the voltages of which define at least two backing picture points. The second or high level is produced when the amplitude of the corresponding foreground component video signal lies within the corresponding voltage range. For example, for the red R, green G and blue B primary color system, the backing is defined by a trichromatic region having three reference voltage ranges relative to red, green and blue colors.

Then the three primary control signals are multiplied into a control signal. The first level of this signal is produced for picture points belonging to the foreground picture (or person) and the second level is produced for picture points belonging to the trichromatic backing. Input means are provided for receiving the foreground and background composite video signals. Switching means are controlled by the control signal to cause the crossing of the foreground composite video signal representative of the person picture through the foreground composite video signal receiving input means when the control signal is at the first or low level and to cause the crossing of the background composite video signal through the background composite video signal receiving input means when the control signal is at the second or high level. The backing is also replaced by the background scene when the control signal is at second level. The resulting picture is obtained by mixing or combining of the composite video signals outputting from input means. The resulting picture, therefore, contains the foreground person in front of the background scene, such as a landscape.

According to the U.S. Pat. No. 3,764,732, the first and second levels of the primary control signals or the control signal are separated by sharp rise and fall fronts, such as logic signals. Consequently, the edge between the moving foreground picture and the background scene picture which replaces the backing, in the resulting composite picture is very clearly defined which does not make it possible to achieve transparency effects. Indeed, when the moving foreground picture includes a transparent or partially transparent object, such as a glass or a bottle, filmed by a first camera, the resulting composite picture presents the backing through the object's transparency, and to a large extent no longer lies within the trichromatic region of the backing. During picture combining, instead of seeing the background scene image, such as a landscape, through the transparent object, one sees the backing through the object. The same phenomenon can occur when the moving foreground picture is a person whose hair is dishevelled. Other composite video signal combining systems are known in which the moving foreground picture is initially reproduced or recorded before a backing which has a selected primary color of high saturation, generally the blue color; these known process are ordinarily referred to by the customary term "blue screen or backing process". With this in mind, reference could be made to U.S. Pat. Nos. 3,778,542; 3,595,987 and 4,007,487, and German Patent Application No. 2,749,254 (claiming U.S. Patent Application priorities Ser. No. 73 8740 of Nov. 3, 1976 and Ser. No. 83 8097 of Sept. 30, 1977).

According to these systems with unicolor backings, the backing is restricted by an open segment along one of the coordinate axes of the trichromatic coordinate system R, G, B, from a determined lower threshold. The picture combination controlling signal is obtained by the selection of the determined threshold, which varies as a function of the amplitude of the selected foreground component video signal, such as the blue component, and which is balanced by a linear relation of one or both of the other two foreground component video signal (red and/or green). The drawback of this balancing is that it must be set manually for each series of foreground scene pictures depending on the prevailing colorimetric tonality of the latter. However, it does make it possible, in certain cases, to visualize the background scene picture through a transparent object of the foreground picture, but with a certain blur which can be adjusted manually. Furthermore, relative to the selected backing color, the moving foreground picture (person or analogous) must not have any picture points with a corresponding primary color component whose amplitude is greater than the sole one of the backing. In other words, the foreground scene picture's (such as a person) trichromatic region is limited by a movable plane which is parallel to the coordinate plane of the other primary color components (red and green) and which cuts the selected primary component's (blue) coordinate axis at a point whose coordinate is equal to the lower threshold of the backing's primary component. The region containing the origin of the trichromatic system and limited by the above-defined plane is that of the foreground (picture part to be included in the resulting picture).

OBJECT OF THE INVENTION

The principal object of this invention is to differentiate between the trichromatic transition region and the trichromatic regions of the foreground scene and backing pictures, so that a first part of the foreground scene picture and a part of the background scene picture be simultaneously transmitted in a ratio which varies when the transition region is detected. Consequently, this invention relates to improvements to systems according to the U.S. Pat. No. 3,764,732.

SUMMARY OF THE INVENTION

According to this invention, a composite video signal combining system combines first and second composite video signals into a resulting composite video signal. The first video signal is representative of a foreground scene, such as a moving person color picture before a trichromatic backing to be included in the resulting composite image. A first part of the foreground picture representative of the moving picture has a trichromatic region which enveloppes a second trichromatic region through a trichromatic transition. The second region represents the backing picture. The background picture is represented by the second composite video signal.

Control means receives the separated video signals (red, green and blue components) forming the first composite video signals. The control means produces a first analog signal $(1-\alpha)$ and a second signal $\alpha$. The analog signal $\alpha$ has a first level (or low level "0"), a second level (or high level "1") and intermediate levels. The first level of signal $\alpha$ corresponds to the detection of foreground picture points having color components belonging to the first trichromatic region (moving picture to be included in the resulting picture). The second level of signal $\alpha$ corresponds to the detection of backing picture points having color components belonging to the second trichromatic region. An intermediate level of signal $\alpha$ correspond to the detection of moving foreground and backing picture points having color components belonging to the trichromatic transition region. The amplitude of an intermediate level is practically in linear relationship with the product of ratios which are each between the amplitude of a first component video signal and one of the voltage limits of the two transition region voltage ranges including this amplitude.

The first analog signal $(1-\alpha)$ controls the crossing of the first composite video signal to deliver the moving foreground picture points when the first analog signal is at the second level, to suppress the backing picture points when the first analog signal is at the first level and to deliver the picture points common with the moving foreground and backing pictures belonging to the trichromatic transition region. The second analog signal $\alpha$ controls the crossing of the second composite video signal to suppress a first part of the background scene corresponding to the transmission of the moving foreground picture by means of the first control signal at the second level, when the second control signal is at the first level, to deliver a second part of the background scene corresponding to the suppression of the backing from the first analog signal $(1-\alpha)$ at the first level, when the second analog signal is at the second level, and to deliver picture points issued from the combination of foreground scene picture points having color components belonging to the trichromatic transition region and background scene points.

When the transition region is detected, the amplitude of the first composite video signal is attenuated simultaneously with the amplification of the amplitude of the second composite video signal when the edge of the transition region adjacent to the trichromatic backing region is detected (intermediate levels of the first and second analog signals are substantially higher than the first or low level and smaller than the second or high level, respectively). Inversely, when the edge of the transition region adjacent to the trichromatic moving foreground region, the amplitude of the first composite video signal is amplified simultaneously with the attenuation of the amplitude of the second composite video signal (intermediate levels of the first and second analog signals are substantially smaller than the second or high level and higher than the first or low level, respectively). In this way, the picture part corresponding to the transition region is composed of a blurred mixture of the moving foreground picture and the background picture.

According to another embodiment, the relative contribution of the transition region is controlled separately in function of each color component. Thus three primary control signals are produced with intermediate levels proportional to the amplitude of the corresponding foreground component video signal and control each the crossing of the corresponding foreground and background component video signals.

BRIEF DESCRIPTION OF THE DRAWING

Other objects and features of this invention will become apparent from the following more particular description of preferred embodiments of the invention as illustrated in the accompanying drawings in which:

FIGS. 3A to 3E are an example waveform diagram illustrating various signals for deriving a primary gain controlling signal from a component video signal relative to the foreground and backing picture.

DESCRIPTION OF THE PREFERRED EMBODIMENTS

Figure 1:
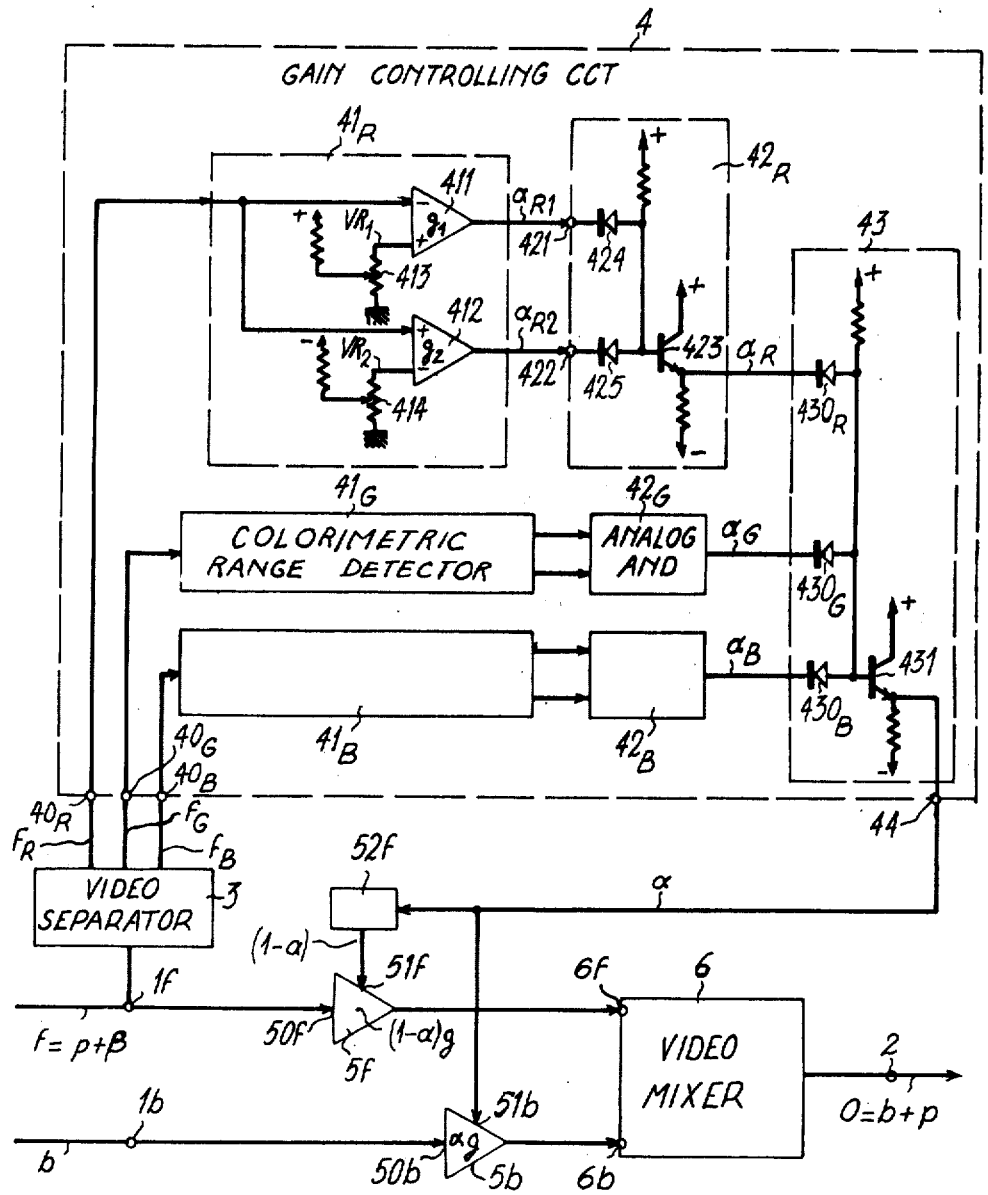
FIG. 1 is a block diagram illustrating a composite video signal combining system in which the gain controlling circuit is detailed.

Referring to FIG. 1, the input terminals 1*f* and 1*b* of the composite video signal combining system receive two composite video signals which are transmitted from a first video source supplying a color composite foreground scene picture f and from a second video source supplying a color composite background scene picture b. The picture f represents a person p moving in front of a colored backing β and the picture b represents for example a color landscape to be substituted for backing β. The colorimetric region of the picture p is substantially the complement of the colorimetric region of the backing picture β in the overall colorimetric system. The first and second video sources are synchronized and are generally electronic color cameras but can also be other video sources which are commonly used in video special-effects techniques, such as video tape recorders, slide projectors, etc.

Figure 2:
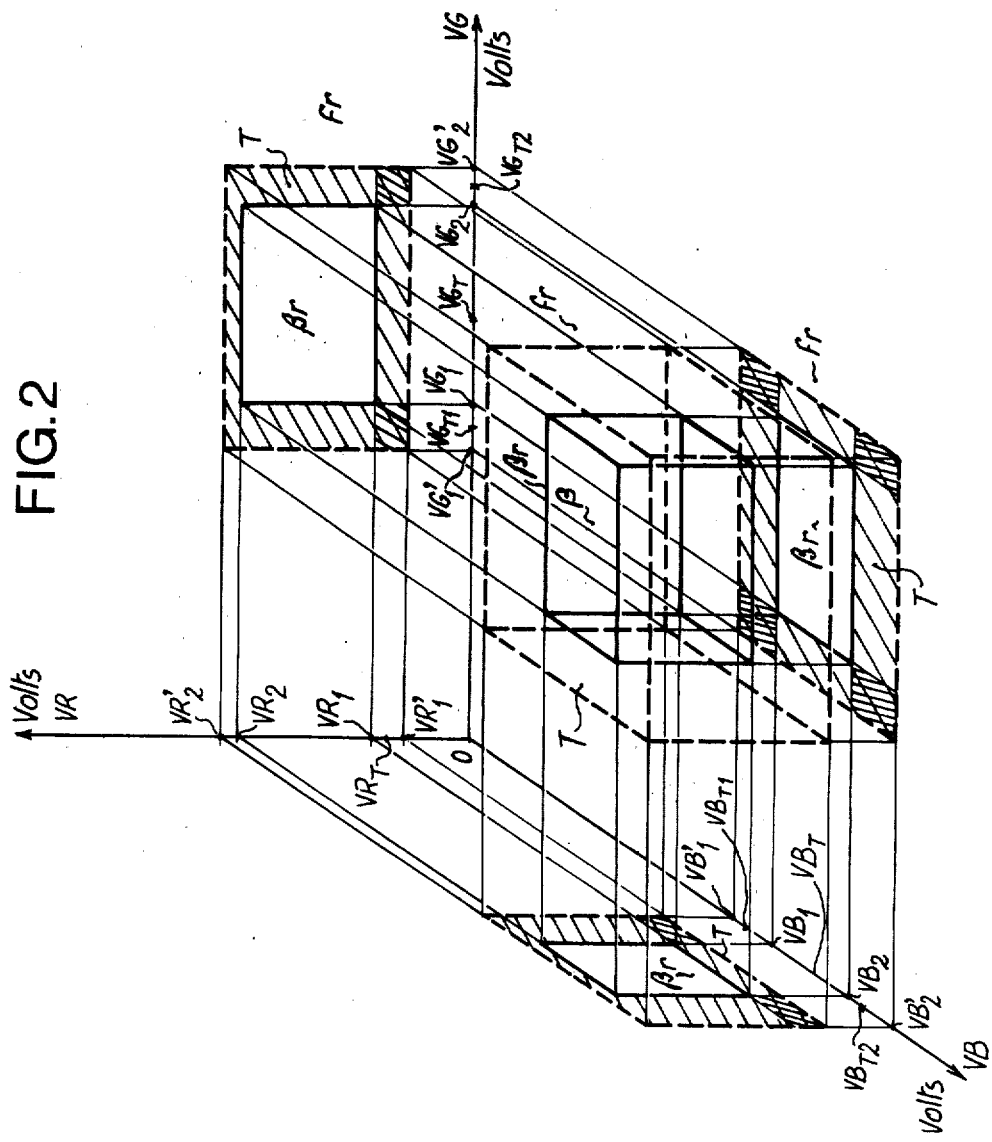
FIG. 2 is a schematic graph showing the colorimetric region limits in the R, G, B trichromatic system which are relative to the foreground scene and backing pictures and define the trichromatic transition region.

The conventional trichromatic cartesian system relative to the three monochromatic coordinates corresponding to the red, green and blue primary component video signals R, G and B of a composite video signal is shown in FIG. 2. The colorimetric region βr of the backing β lies inside a parallelepiped which is marked out by three pairs of parallel planes defined by first reference voltages and having the equations $VR=VR_1$ and $VR=VR_2$, $VG=VG_1$ and $VG=VG_2$, $VB=VB_1$ and $VB=VB_2$. The colorimetric region fr of the foreground scene person picture p lies outside a parallelepiped which is marked out by three pairs of parallel planes defined by second reference voltages and having the equations $VR=VR_1'$ and $VR=VR_2'$, $VG=VG_1'$ and $VG=VG_2'$, $VB=VB_1'$ and $VB=VB_2'$.

The backing region βr is contained within foreground region fr. Regions βr and fr are separated by a so-called transition region T whose parts not covered by the backing region βr and projected onto planes $VR=O$, $VG=O$ and $VB=O$ are shaded on FIG. 2. The transition region T corresponds to the "blurry" mixture of colors of the common edges of the backing and foreground pictures β, p or, more generally, to the common or mixed picture parts of the backing and foreground pictures p and β. Pictures parts such as these comprise, for example, a person's dishevelled hair or a transparent object such as a glass or a bottle, through which the backing β appears. In the video signal combining system of the above mentioned U.S. Pat. No. 3,764,732 where the separation of the picture regions pr and βr was sharp at the planes marking out parallelepipedal region βr, the output resulting picture presented said common parts with said backing β. This produced an annoying edge effect and also an imprecise reproduction of the background scene. On the other hand, in accordance with an aspect of the invention, the system in FIG. 1 makes it possible to eliminate this defect because, in the output resulting composite video signal r transmitted by the output terminal 2 of the system, a glass of the foreground picture p, for instance, makes the corresponding part of the background scene appears through it.

It will be noted that the two ranges of reference voltages of the transition region T relative to each colorimetric coordinate R, G, B, namely $VR_1$-$VR_1'$ and $VR_2'$-$VR_2$, $VG_1$-$VG_1'$ and $VG_2$-$VG_2'$, $VB_1$-$VB_1'$ and $VB_2'$-$VB_2$ respectively, can be different and can be selected independently by the operator with respect to each other and with respect to the four others of the other two primary component video signals as will be seen hereafter.

Still with reference to FIG. 2, it will be noted relative to the known video signal combining systems using the "blue screen or backing process", that the backing region is a point with coordinates $VB_1$, O,O or an open segment colinear with the coordinate axis VB, representing VB values greater than $VB_1$. The colorimetric region of the foreground scene picture, such as a person, is defined by all the points having their blue selected primary color component such that $VB<VB_1$. According to this prior art, the threshold $VB_1$ depends on a linear relation of the other two primary color components such that $VB_1=k_R\ VR+k_G\ VG$, where $k_R$ and $k_G$ are manually adjustable parameters.

As shown in FIG. 1, it has been assumed that the input terminals 1b and 1f receive directly the composite video signals representative of the background scene b and the foreground scene and backing composite picture $f=p+β$. The foreground video signal f is delivered to the input terminal of a video separator 3 which filters the three primary component video signals $f_R$, $f_G$ and $f_B$ representative of the foreground scene f and transmits them to the three input terminals $40_R$, $40_G$, $40_B$ of a gain controlling circuit 4. However, according to other embodiments depending on the adopted color television procedure, the video signals f and b can be delivered from first and second video sources directly in the form of primary component video signals $f_R$, $f_G$, $f_B$ and $b_R$, $b_G$, $b_B$ or another combination of the latter. In the latter case, the primary component video signals are transmitted directly to the input terminals $40_R$, $40_G$, $40_B$, and conventional video mixers restore video signals b and f at the input terminals 1b and 1f.

The composite video signals b and f are transmitted to the video input terminals 50b and 50f of variable gain amplifiers 5b and 5f, respectively. The amplifiers 5b and 5f have a maximum gain g and offer a respective gain variation of αg and (1−α)g which is correlated with the gain controlling signal α transmitted by the output terminal 44 of the gain controlling circuit 4. The signal α is an analog voltage signal which varies between a first level termed lower level equal to zero and a second level termed upper level equal to unity. The signal α controls the insertion of the part of the foreground video signal f representative of the foreground scene picture p in the background video signal b by eliminating the edge effects.

The signal α is derived from the analog product of primary gain controlling signals $α_R$, $α_G$, $α_B$, such as $α_R$ shown in FIG. 3D which is relative solely to the detection of the red primary monochromatic intervals associated with regions βr, pr and T, and which thus does not depend on the other two primary component video signals (blue and green) representative of the composite foreground scene and backing picture $f=p+f$. The lower level of the signal α corresponds to the detection of points of composite foreground picture f coming within colorimetric region fr of the person picture p and the upper level of the signal α corresponds to the detection of points of the picture f coming within colorimetric region βr of the backing β. An intermediate voltage level of signal α lies between the lower and upper levels and corresponds to the detection of points of the composite foreground picture f coming within trichromatic transition region T which is common to the person picture p and the backing picture α. The intermediate voltage level representative of an image point in the transition region T is equal to the product of one, two or three ratios depending on whether one, two or three primary coordinates of the point are situated respectively in a range of reference voltages which define two planes parallel to and bordering on parallelepipedal regions αr and fr. Each ratio is equal to the ratio of the distance from the point to the parallel face associated with the region αr or region fr and the distance between the two parallel faces associated with regions αr and fr respectively for each coordinate, or can be equal to a relation almost linear with this ratio. For example, for a point in the transition region T which has a red coordinate $VR_T$ and which lies between the planes defined by the voltage range $VR=VR_1'$ and $VR=VR_1$, as shown in FIGS. 2 and 3A, the ratio product is the product of:

(a) a first ratio equal to $(VR_T\text{-}VR_1')/(VR_1\text{-}VR_1')$, if the considered point has second blue and green coordinates $VG_T$, $VB_T$ which lie in the region βr between the respective pairs of planes $VG=VG_1$, $VG=VG_2$ and $VB=VB_1$, $VB=VB_2$;

(b) said first ratio and a second ratio equal to $(VG_{T1}\text{-}VG_1')/(VG_1\text{-}VG_1')$ or $(VG_{T2}\text{-}VG_2)/(VG_2'\text{-}VG_2)$, if the considered point has a second green coordinate $VG_{T1}$ or $VG_{T2}$ lies between the planes $VG=VG_1'$ and VG=VG$_1$ or the planes VG=VG$_2$ and VG=VG$_2$' and has third blue coordinate VB$_T$ which lies between planes VB=VB$_1$ and VB=VB$_2$;

(c) said first ratio and another second ratio equal to (VB$_{T1}$-VB$_1$')/(VB$_1$-VB$_1$') or to (VB$_{T2}$-VB$_2$)/(VB$_2$'-VB$_2$), if the considered point has a third blue coordinate VB$_{T1}$ or VB$_{T2}$ which lies between the planes VB=VB$_1$' and VB=VB$_1$ or between the planes VB=VB$_2$ and VB=VB$_2$' and has a second green coordinate VG$_T$ which lies between the planes VG=VG$_1$ and VG=VG$_2$;

(d) said first ratio, one of said second above-defined ratios (b) or (c) and a third ratio equal to one of said second above-defined ratios (b) or (c), if the considered point comes within the four parallelepipedal sub-regions of the transition region T between the pairs of edges of regions βr and fr, such as those shown by the cross-shaded areas on FIG. 2.

It will be noted that, if one of the coordinates of a point of the colorimetric region is greater than VR$_2$', VG$_2$' and VB$_2$' or smaller than VR$_1$', VG$_1$' and VB$_1$', respectively, the point comes within region fr of foreground scene picture (person) p and consequently corresponds to the lower level of the gain controlling signal α.

As shown in FIG. 1, the gain controlling signal α is directly transmitted from the output terminal 44 to the gain control terminal 51b of the variable gain amplifier 5b and to the input terminal of an analog inverter circuit 52f which restores the signal (1−α) to the gain control terminal 51f of the variable gain amplifier 5f. The output terminals of the amplifiers 5b and 5f are connected to the input terminals 6b and 6f of a conventional video mixer 6, the output terminal 2 of which provides the output composite video signal 0 representative of the resulting combined picture. This video signal 0 restores, in accordance with the equation: signal 0=[α(signal b)+(1−α) (signal f)]g: (a) the zone of background scene picture b which corresponds to that of the backing region βr, when the signal α is at the second or upper level (β=1); (b) the zone of the foreground scene picture f which corresponds to that of person region fr of the foreground scene picture, when the signal α is at the first or lower level (α=0); (c) the picture zone which is common to the pictures p and b coming within trichromatic transition region T, when the signal α has an intermediary level lying between the first and second levels "0" and "1" with a preponderant contribution of foreground (or person) picture p when the level of the signal α is close to first level "0" and a preponderant contribution of background scene picture b when the level of the signal α is close to second level "1".

The gain controlling circuit delivering the gain controlling signal α will now be described with reference to FIGS. 1 and 3. A detector 41$_R$, 41$_G$, 41$_B$ which detects primary colorimetric ranges coming within regions αr, fr and T, and an analog multiplication circuit 42$_R$, 42$_G$, 42$_B$ are connected in series to the input terminal 40$_R$, 40$_G$, 40$_B$ respectively, which provides a primary component video signal f$_R$, f$_G$, f$_B$ of the foreground video signal f. Only the detector 41$_R$ and the multiplication circuit 42$_R$ are detailed in FIG. 1, the others being respectively identical except as regards the settings of the reference voltages limiting the colorimetric ranges.

The detector 41$_R$ includes two variable gain operational amplifiers 411 and 412, the inverting (−) and direct (+) inputs of which are respectively connected to the terminal 40$_R$. Each amplifier 411, 412 is a non-linear amplifier which has a gain varying as a practically linear function of the voltage applied at its input with an admission range determined by its gain and has a low output impedance. The other direct (+) or inverting (−) input of the amplifiers 411 and 412 receives a voltage signal VR$_1$ or VR$_2$. A potentiometer 413 or 414 adjusts the respective voltage signal VR$_1$ or VR$_2$ which corresponds to one of the reference voltage limits of the primary red color of the region αr of the backing α. The adjustment of the potentiometers 413 and 414 can be common for a predetermined constant difference VR$_2$-VR$_1$. The amplifier 411 amplifies any signal of amplitude f$_R$ which lies between first limits VR$_1$ and VR$_1$' of the transition region T, with a gain g$_1$ proportional to k$_1$(f$_R$-VR$_1$')/(VR$_1$-VR$_1$'), where k$_1$ is a constant dependent on the gain adjustment of the amplifier 411 and a function of voltage range (VR$_1$-VR$_1$'). Likewise, the amplifier 412 amplifies and signal of amplitude f$_R$ which lies between second limits VR$_2$ and VR$_2$' of the transition region T, with a gain g$_2$ proportional to k$_2$(f$_R$-VR$_2$')/(VR$_2$-VR$_2$'), where k$_2$ is a constant dependent on the gain adjustment of the amplifier 412 and a function of voltage range (VR$_2$-VR$_2$'). Thus, when the red color component video signal f$_R$ shown in FIG. 3A comes within colorimetric region fr such that f$_R$<VR$_1$', the amplifiers 411 and 412 are "turned off" (g$_1$=0) and "turned on" (g$_2$=1), respectively and feed two low and high level signals α$_{R1}$, α$_{R2}$ to the input terminals 421, 422 of the analog multiplication circuit 42$_R$. Conversely, when f$_R$>VR$_2$', the amplifiers 411 and 412 are "turned on" (g$_1$=1) and "turned off" (g$_2$=0) respectively and the signals α$_{R1}$ and α$_{R2}$ are at upper and lower levels, respectively. Consequently, when f$_R$ has a level coming within the backing region βr, such that VR$_1$≦f$_R$≦VR$_2$, the signals α$_{R1}$ and α$_{R2}$ are both at the upper level. When f$_R$ is at an intermediate level coming within transition region T, the signals α$_{R1}$ and α$_{R2}$ vary between 0 and 1 analogous to the amplitude of f$_R$ when VR$_1$'≦f$_R$≦VR$_1$ and when VR$_2$≦f$_R$≦VR$_2$', respectively. The signals α$_{R1}$ and α$_{R2}$ are delivered from the outputs of the amplifiers 411 and 412, are illustrated in FIGS. 3B and 3C, and correspond to the red color component video signal f$_R$ shown in FIG. 3A.

The combination of the signals α$_{R1}$ and α$_{R2}$ from analog multiplication into a primary gain controlling signal α$_R$ is performed in a circuit 42$_R$ such as a conventional analog AND-gate which comprises a transistor 423 on the output side and two diodes 424, 425, as shown in FIG. 1, or two diode-mounted transistors, on the input side. The other two analog multiplication circuits 42$_G$ and 42$_B$ restore primary gain controlling signals α$_G$ and α$_B$ which mark out, in a similar fashion to the signal α$_R$ shown in FIG. 3D; the green and blue colorimetric ranges associated with the regions βr, fr and T. The analog multiplication of the three primary gain controlling signals α$_R$, α$_G$, α$_B$ is carried out by means of an analog multiplication circuit 43 such as a conventional analog AND-gate. This circuit 43 comprises on the three input terminals three diodes 430$_R$, 430$_G$, 430$_B$ which receive the signals α$_R$, α$_G$, α$_B$, respectively, as shown in FIG. 1, or three diode-mounted transistors, and a transistor 431 on its output side 44. The output terminal 44 of the circuit 43 provides an overall gain controlling signal α to the variable gain amplifiers 5b and 5f.

Figure 4:
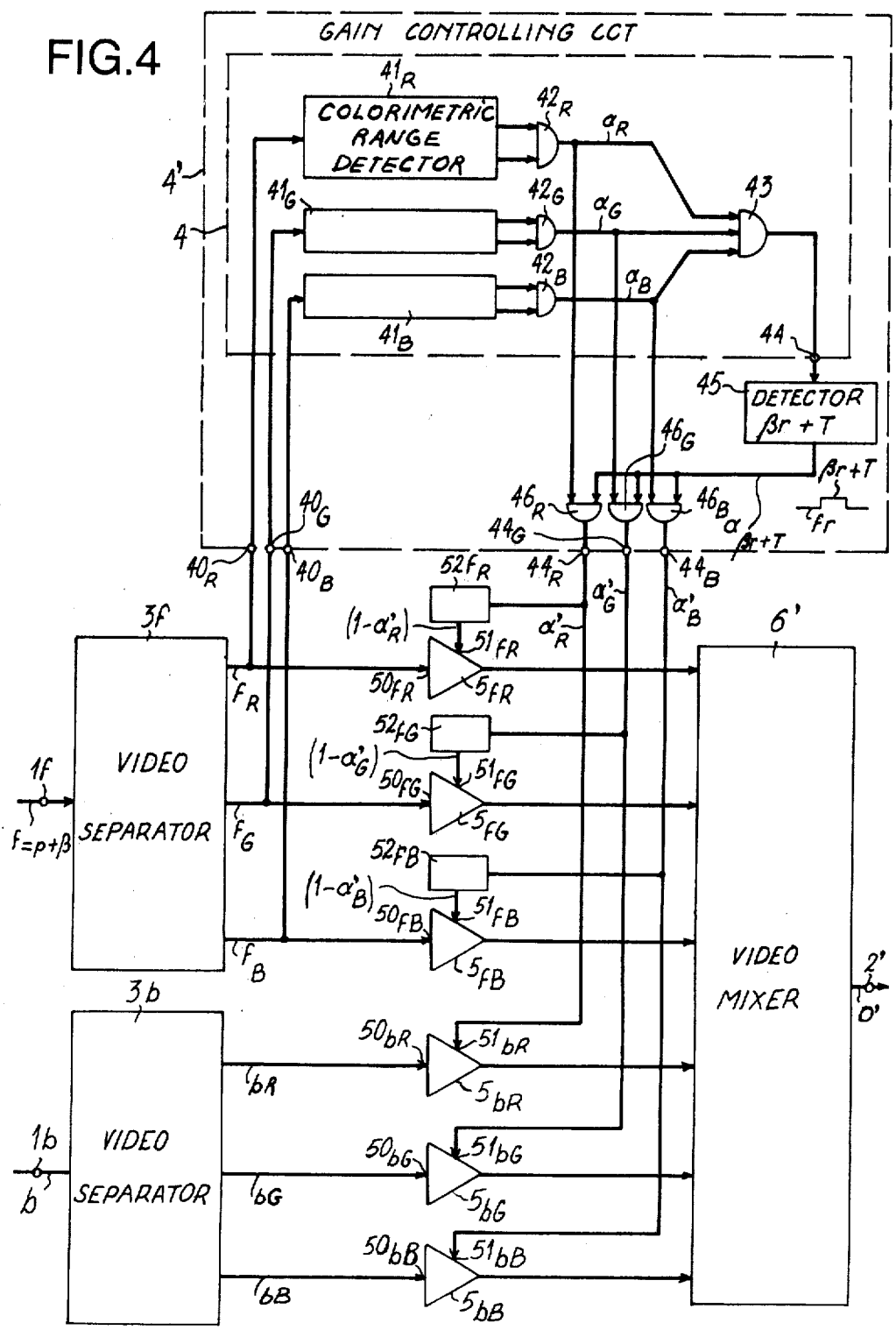
FIG. 4 is a block diagram illustrating a second embodiment of a composite video signal combining system in which the gain controlling circuit has a part analogous to that of FIG. 1.

A second embodiment of the composite video signal combining system is illustrated in FIG. 4. It comprises, if necessary, the video separator 3f and a video separator 3b. The video separator 3b receives the color composite video signal b representative of the background scene from input terminal 1b. The video separators 3b and 3f filter and separate the primary component video signals $b_R$, $b_G$, $b_B$ and $f_R$, $f_G$, $f_B$ received from composite video signals b and f. The three output terminals of the video separator 3f feed the separated component video signals $f_R$, $f_G$, $f_B$ to video input terminals $50_{fR}$, $50_{fG}$, $50_{fB}$ of three first variable gain amplifiers $5_{fR}$, $5_{fG}$, $5_{fB}$ respectively. The three output terminals of the video separator 3b feed separated component video signals $b_R$, $b_G$, $b_B$ to video input terminals $50_{bR}$, $50_{bG}$, $50_{bB}$ of three second variable gain amplifiers $5_{bR}$, $5_{bG}$, $5_{bB}$, respectively. The first and second amplifiers are analogous to the amplifiers $5_b$ and $5_f$ in FIG. 1 and have a maximum gain g. The gain control inputs $51_{fR}$, $51_{fG}$, $51_{fB}$ of the amplifiers $5_{fR}$, $5_{fG}$, $5_{fB}$ each receiving a second inverted primary gain controlling signal $(1-\alpha_R')$, $(1-\alpha_G')$, $(1-\alpha_B')$, respectively, via an analog inverter circuit $52_{fR}$, $52_{fG}$, $52_{fB}$. The input of an inverter circuit and the gain control input of a second variable gain amplifier associated with a same component video signal of the composite video signals f and b receive the corresponding second primary gain controlling signal $\alpha_R'$, $\alpha_G'$, $\alpha_B'$ which is delivered from the respective output terminal $44_R$, $44_G$, or $44_B$ of a gain controlling circuit 4'. The circuit 4' comprises the gain controlling circuit 4 of FIG. 1 and, in addition, a detector 45 which detects the colorimetric region $\beta r+T$, and three analog multiplication circuits such as analog AND-gates $46_R$, $46_G$, $46_B$. The components circuits $41_R$, $41_G$, $41_B$, $42_R$, $42_G$, $42_B$, and 43 between the input terminals $40_R$, $40_G$, $40_B$ which are connected respectively to the output terminals of the video separator 3f, and the output terminal 44 of the circuit 4 are identical to those circuits described in reference to FIG. 1.

The input of detector 45 is connected to the terminal 44 and receives the gain controlling signal $\alpha$. The output of the detector 45 is connected to first inputs of the analog AND circuits $46_R$, $46_G$, $46_B$. The detector 45 consists of suitable flip-flops or a voltage comparator. It detects the transition of the signal $\alpha$ from a low to an intermediate level, and inversely, so as to deliver a signal $\alpha_{\beta r+T}$ whose the low or first level marks the foreground region fr of the person picture p, when the signal $\alpha$ is at the low level, and whose the upper or second level marks the region $\alpha r+T$, when the signal $\alpha$ is at the upper level or at an intermediate level. The second inputs of the analog AND circuits $46_R$, $46_G$, $46_B$ are connected respectively to the output terminals of the analog AND circuits $42_R$, $42_G$, $42_B$ which deliver the first primary gain controlling signals $\alpha_R$, $\alpha_G$, $\alpha_B$. Each second primary controlling signal $\alpha_R'$, $\alpha_G'$, $\alpha_B'$ is transmitted respectively from the output terminals $44_R$, $44_G$, $44_B$ of the analog AND-gates $46_R$, $46_G$, $46_B$ to the input terminals of the corresponding inverter circuits $52_{fR}$, $52_{fG}$, $52_{fB}$ and the gain control inputs $51_{bR}$, $51_{bG}$, $51_{bB}$ of the corresponding variable gain amplifiers $5_{bR}$, $5_{bG}$, $5_{bB}$. Each second primary controlling signal is analogous to the signal $\alpha$ with the exception that the rise and fall fronts at intermediary levels are not longer an overall contribution of the primary component video signals representative of the foreground picture f, but rather an individual contribution of the associated primary component video signal $f_R$, $f_G$, $f_B$. Consequently, the output composite video signal $0'$ of the resulting picture which is transmitted from the output terminal $2'$ of a conventional video mixer $6'$ whose six input terminals are connected to the output terminals of the six variable gain amplifiers $5_{fR}$ to $5_{fB}$, respectively, reproduces the transition region T more accurately. Indeed, according to the first embodiment shown in FIG. 1, the intermediate levels of the signal $\alpha$ control a gain variation which is common to amplifications of the component video signals in the amplifiers $5b$ and $5f$, i.e. relative to the luminance of the composite video signals b and f, whereas according the second embodiment the gain variations relative to each primary component color of transition region T are controlled independently.

Although the invention has been described with reference to two preferred embodiments, it will be apparent that various modifications may be made, particularly in the gain controlling circuit, without depending from the scope of my invention. The preceding convention, whereby the first level is low relative to the foreground scene picture (person) p and the second level is high relative to the backing picture $\beta$, can be reversed. Furthermore, any other colorimetric coordinate system stemming from the system R, G, B from linear relations can by employed. In particular, it is possible to make use of the well-known coordinate system R-Y, B-Y, Y where Y is the luminance signal of a color picture video signal.

What I claim is:

1. A system for combining first and second composite video signals into a resulting composite video signal, said first composite video signal representing a first color picture having a first trichromatic region envelopping a second trichromatic region through a trichromatic transition region and said second composite video signal representing a second color picture, said system comprising:

first input means for receiving said first composite video signal;

second input means for receiving said second composite video signal;

third input means for receiving first component video signals forming said first composite video signal;

means connected to said third input means for producing a first analog signal $(1-\alpha)$ and a second analog signal $(\alpha)$ which control the crossing of said first and second composite video signals through said first and second input means to provide first and second output composite video signals which are obtained from an amplification with a gain proportional to said first and second analog signals, said first analog signal having first and second levels when said first component video signals are representative of said first and second picture regions and having intermediate levels lying between said first and second levels when said first component video signals are representative of said transition region; and means for mixing said first and second output composite video signals into said resulting composite video signal.

2. A system for combining first and second composite video signals into a resulting composite video signal, said first composite video signal representing a first color picture having a first trichromatic region envelopping a second trichromatic region through a trichromatic transition region and said second composite video signal representing a second color picture, said system comprising:

first input means for receiving said first composite video signal;

second input means for receiving said second composite video signal;

third input means for each receiving one of first component video signals forming said first composite video signal;

means each connected to one of said third input means for producing a primary analog signal having first and second levels when the corresponding first component video signal is representative of said first and second picture regions and having intermediate levels lying between said first and second levels when said corresponding first component video signal is representative of said transition region;

analog means for multiplying said primary analog signals into a gain controlling signal α which controls the crossing of said second composite video signal through said second input means to provide a second output composite video signal which is obtained from an amplification with a gain proportional to said controlling signal α;

analog means for reversing said gain controlling signals α into a reversed gain controlled signal (1−α) which controls the crossing of said first composite video signal through said first input means to provide a first output composite video signal which is obtained from an amplification with a gain proportional to said reversed gain controlling signal (1−α); and means for mixing said first and second output composite video signals into said resulting composite video signal.

3. A system according to claim 2, wherein said first and second input means are variable gain amplifiers which are controlled by said reverse gain controlling signal (1−α) and said gain controlling signal α, respectively.

4. A system according to claim 2, wherein said analog multiplying means is an analog AND-gate, the inputs of which receive said primary analog signals.

5. A system for combining first and second composite video signals into a resulting composite video signal, said first composite video signal having a first trichromatic region envelopping a second trichromatic region through a trichromatic transition region, each of first component video signals forming said composite video signal which represents said first region, having its amplitude lying outside a first range of reference voltages and each of said first component video signals which represents said second region, having its amplitude lying inside a second range of reference voltages, said transition region being defined by picture points having component video signal amplitude inside two transition voltage ranges boundered by said first and second voltage ranges, respectively, said system comprising:

first input means for receiving said first composite video signal;

second input means for receiving said second composite video signal;

third input means for each receiving one of said first component video signals;

means each connected to one of said third input means for producing a primary analog signal having a first level when the amplitude of the corresponding first component video signal does not lie within said corresponding first voltage range, a second level when said amplitude of said corresponding first component video signal lies within said corresponding second voltage range and intermediate levels lying between said first and second levels when said amplitude of said corresponding first component video signal lies within one of said two transition voltage ranges boundered by said corresponding first and second voltage ranges, each of said intermediate levels being practically linear relationship with the ratio between said corresponding first component video signal amplitude and one of the voltage limits of said transition voltage range including said amplitude;

analog means for multiplying said primary analog signals into a gain controlling signal α which controls the crossing of said second composite video signal through said second input means to provide a second output composite video signal which is obtained from an amplification with a gain proportional to said gain controlling signal α;

analog means for reversing said gain controlling signal α into a reversed gain controlled signal (1−α) which controls the crossing of said first composite video signal through said first input means to provide a first output composite video signal which is obtained from an amplification with a gain proportional to said reversed gain controlled signal (1−α); and means for mixing said first and second output composite video signals into said resulting composite video signal.

6. A system according to claim 5, wherein each of said primary analog signal producing means comprises:

two variable gain amplifiers, each of which having a first input at one voltage limit of one of said two transition voltage ranges in accordance with the corresponding first component video signal and a second input receiving said corresponding first component video signal, and the gain of each of said two variable gain amplifiers varying practically linearly with the amplitude of said corresponding first component video signal when said amplitude lies within said transition voltage range associated with said amplifier, and primary analog means for multiplying the outputting signals from said variable gain amplifiers into said primary analog signal.

7. A system according to claim 6, wherein each of said primary analog signal producing means comprises means for adjusting said voltage limits applied to said first inputs of said variable gain amplifiers.

8. A system according to claim 6, wherein said primary analog multiplying means in an analog AND-gate having its two inputs connected to outputs of said two variable gain amplifiers.

9. A system for combining first and second composite video signals into a resulting composite video signal, said first composite video signal representing a first color picture having a first trichromatic region envelopping a second trichromatic region through a trichromatic transition region and said second composite video signal representing a second color picture, said system comprising:

first input means for each receiving one of first component video signals forming said first composite video signal;

second input means for receiving one of second component video signals forming said second composite video signal;

means each receiving one of said first component video signals for producing a first analog signal having first and second levels when the corresponding first component video signal is representative of said first and second picture regions and having intermediate levels lying between said first and second levels when said corresponding first component video signal is representative of said transition region;

first analog means for multiplying said first analog signals into a second analog signal;

means receiving said second analog signal for producing a logic signal having said first level when said second analog signal is at said first level and having said second level when said second analog signal is at said second level or at an intermediate level;

second analog means for each multiplying one of said first analog signals by said logic signal into a third analog signal which controls the crossing of the corresponding second component video signal through the corresponding second input means to provide a second input component video signal which is obtained from an amplification with a gain proportional to said third analog signal;

analog means for each reversing one of said third analog signals into a reversed analog signal which controls the crossing of said corresponding first component video signal through the corresponding first input means to provide a first output component video signal which is obtained from an amplification with a gain proportional to said reversed analog signal; and means for mixing said first and output component video signals into said resulting composite video signal.

10. A system according to claim 9 wherein said first and second input means are variable gain amplifiers which are controlled by said reverse analog signals and said third analog signals, respectively.

11. A system according to claim 9, wherein said first analog multiplying means is an analog AND-gate, the inputs of which receive said first analog signals.

12. A system according to claim 9, wherein each of said second analog multiplying means is an analog AND-gate, two inputs of which receive said logic signal and the corresponding first analog signal.

13. A system for combining first and second composite video signals into a resulting composite video signal, said first composite video signal having a first trichromatic region envelopping a second trichromatic region through a trichromatic transition region, each of first component video signals forming said first composite video signal which represents said first region, having its amplitude lying outside a first range of reference voltages and each of said first component video signals which represents said second region, having its amplitude lying inside a second range of reference voltages, said transition region being defined by picture points having component video signal amplitude inside two transition voltage ranges boundered by said first and second voltage ranges, respectively, said system comprising:

first input means for each receiving one of said first component video signals;

second input means for each receiving one of second component video signals forming said second composite video signal;

means each receiving one of said first component video signals for producing a first analog signal having a first level when the amplitude of the corresponding first component video signal does not lie within said corresponding first voltage range, a second level when said amplitude of said corresponding first component video signal lies within said corresponding second voltage range and intermediate levels lying between said first and second levels when said amplitude of said corresponding first component video signal lies within one of said two transition voltage ranges boundered by said corresponding first and second voltage ranges, each of said intermediate levels being practically linear relationship with the ratio between said corresponding first component video signal amplitude and one of the voltage limits of said transition voltage range including said amplitude;

first analog means for multiplying said first analog signals into a second analog signal;

means receiving said second signal for producing a logic signal having said first level when said second analog signal is at said first level and having said second level when said second analog signal is at said second level or at an intermediate level;

second analog means for each multiplying one of said first analog signals by said logic signal into a third analog signal which controls the crossing of the corresponding second component video signal through the corresponding second input means to provide a second output component video signal which is obtained from an amplification with a gain proportional to said third analog signal;

analog means for each reversing one of said third analog signal into a reversed analog signal which controls the crossing of said corresponding component video signal through the corresponding first input means to provide a first output component video signal which is obtained from an amplification with a gain proportional to said reversed analog signal; and means for mixing said first and output component video signals into said resulting composite video signal.

* * * * *